Jan. 3, 1967  KAZUMI MASAKI  3,295,528
ELECTRICAL THERAPEUTIC EQUIPMENT
Filed Sept. 11, 1962  2 Sheets-Sheet 1
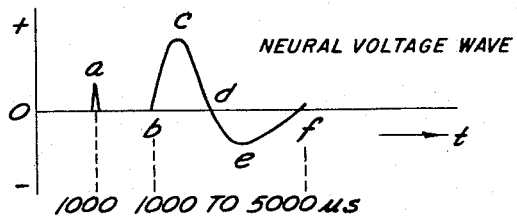
Fig-1-
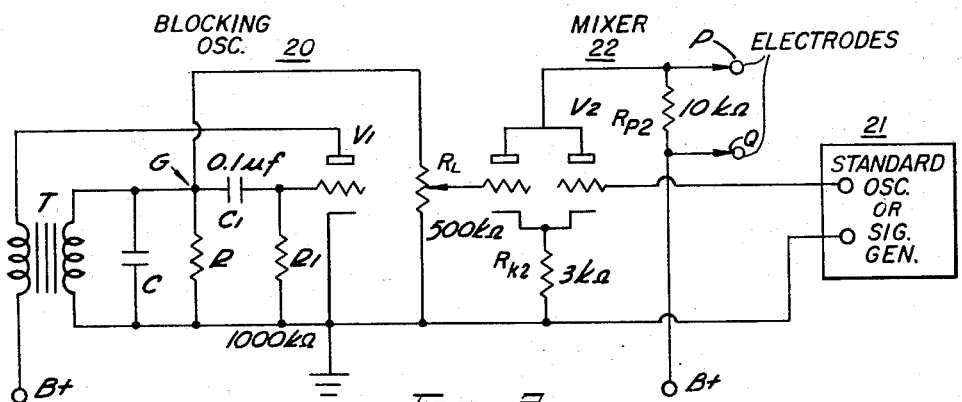
Fig-2-
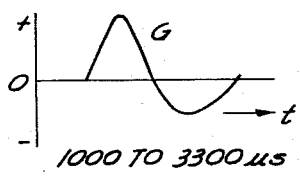
Fig-3-
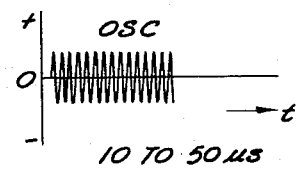
Fig-4-
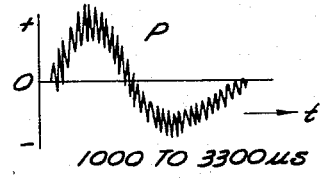
Fig-5-
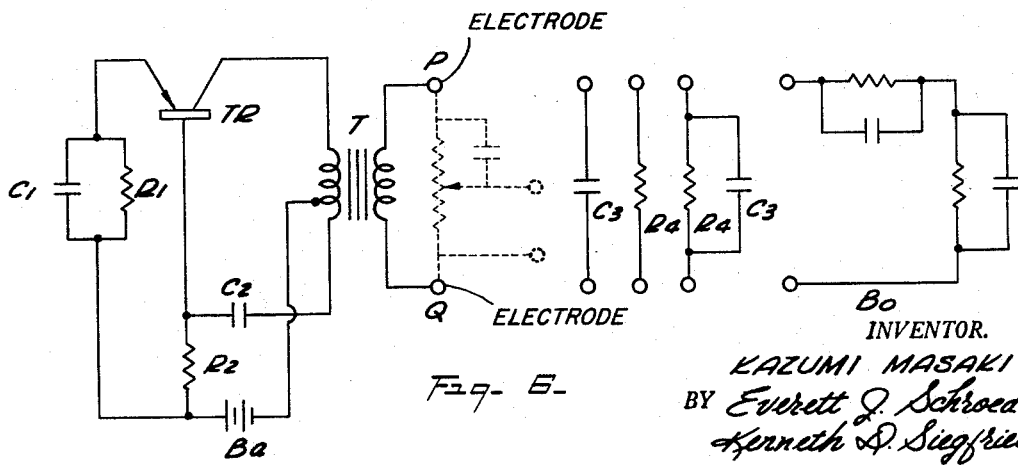
Fig-6-
INVENTOR.
KAZUMI MASAKI
BY Everett J. Schroeder
Kenneth D. Siegfried
ATTORNEYS Jan. 3, 1967  KAZUMI MASAKI  3,295,528
ELECTRICAL THERAPEUTIC EQUIPMENT
Filed Sept. 11, 1962  2 Sheets-Sheet 2

INVENTOR.
KAZUMI MASAKI
BY Everett J. Schroeder
Kenneth A. Siegfried
ATTORNEYS

United States Patent Office 3,295,528
Patented Jan. 3, 1967

3,295,528
ELECTRICAL THERAPEUTIC EQUIPMENT
Kazumi Masaki, Toyonaka, Osaka Prefecture, Japan, assignor to Sutetaro Yamashiki, Fukiaiku, Kobe, Japan
Filed Sept. 11, 1962, Ser. No. 222,792
4 Claims. (Cl. 128—422)

The present invention is directed to an electrical therapeutic device which can produce a voltage wave form which approximates that of the neural wave form. That is, it approximates a wave form produced by a nerve cell of a warm blooded animal or human when the nerve cell is subjected to an electrical impulse. Generally, low frequency therapeutic equipment has used a rectangular pulsating voltage wave for the treatment of the human body. The rectangular wave has its chief advantage in the fact that it will allow a high current to be passed through the human body without causing pain, but it is not particularly adapted for the purpose of activating the muscles within the body. It has been confirmed by experiments, that a voltage wave form conforming to a neural voltage is more effective in causing the same movement of the muscles within a stiff shoulder for instance, than with the previously employed rectangular pulsating wave. It has also been found that much less current must be passed through the body when using the neural wave shape pulses and therefore the body is subjected to a much lower current for stimulating the muscles by actually inducing movement of the muscles through the nerve cells.

It is therefore a general object of the present invention to provide new and improved therapeutic voltage generating equipment for use on the human body.

It is yet another object of the present invention to provide a neural voltage generator for exciting the nerves to stimulate muscles of the body within a predetermined area.

It is still another object of the present invention to provide an improved output circuit in electrical therapeutic equipment for matching the impedance of the therapeutic equipment to that of the body area to be treated.

It is still a further object of this invention to provide an impedance control circuit which increases the life of the battery in an oscillator circuit.

These and other objects and advantages of my invention will more fully appear from the following description made in connection with the accompanying drawings, and in which:

FIG. 1 is a diagram of a neural voltage wave form;

FIG. 2 is a schematic diagram of illustrative and conventional therapeutic equipment so arranged as to simulate the neural voltage wave form;

FIG. 3 is a diagram of a wave shape taken as point G with respect to ground of FIG. 2;

FIG. 4 is a diagram of a voltage taken at the output of an oscillator of FIG. 2;

FIG. 5 is a diagram of the superimposed wave form shown in FIGS. 3 and 4;

FIG. 6 is a schematic diagram of an embodiment of the therapeutic equipment using a transistor circuit;

Figure 7:
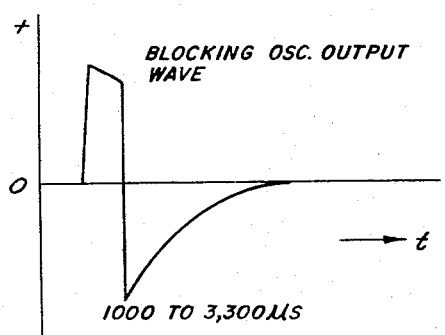
FIG. 7 is a typical wave shape obtained from a blocking oscillator.

To best understand the operation of the therapeutic equipment, reference is made to FIG. 1 in which a neural wave form is shown which is produced by a nerve cell of a human being or warm blooded animal upon excitation by an electrical impulse. That is, if the nerve fiber or nerve cell of a warm blooded animal has an electrical impulse of 0.5 to 30 volts applied thereto such as shown at point "a" on the time base of FIG. 1, an output signal generally shown somewhat like a sine wave assuming a pattern of "b–c–e–f" will be created approximately 1000 $\mu$s. (microseconds) after application of the impulse at point "a" on the time base. The nerve tissue will then produce the wave shape which is somewhat similar to the sinusoidal wave shape as just described. It has also been found that if a neural voltage having a wave shape or wave form of the same pattern as that shown in FIG. 1, is artificially created and applied to the human body, a healthful or salubrious effect will be created. Therefore, if by creating artificially, such a wave shape and applying it to the portion of the body in which the particular muscles are to be treated, a most desirable effect may be obtained.

FIG. 2 shows a blocking oscillator 20 and another oscillator 21 which are conected to a mixing circuit 22 to produce a particular output voltage. Blocking oscillator 20 is of a standard type generally well known to those skilled in the art and if further reference is needed to the operation of such a device, such reference may be had to "Electronic Fundamentals and Applications," by John D. Rider, published by Prentice Hall Electrical Engineering Series, 1950, p. 596. By choosing the appropriate values of the capacitor C and the resistance R, the neural wave form may be reproduced as to shape and form and the repetition frequency of the blocking oscillator may be determined by the proper selection of capacitor $C_1$ and resistance $R_1$. During operation of the blocking oscillator, a wave form such as found in FIG. 3 is produced at point "G" and it will be seen that this wave form resembles the neural voltage. However, if this particular voltage of this wave shape and of the same frequenecy as that produced by the nerve cell is passed through the human body, it has been found to be unacceptable as a means of treating the particular body area. However, if an additional signal is produced from a separate oscillator such as oscillator 21, a different result may be had which will now be explained. Oscillator 21 also generally designated as OSC. produces an output signal of 20 to 100 kilocycles per second. This is a standard oscillator generally well known to those skilled in the art and its only requirement is that it produce a sinusoidel voltage wave. The voltage wave obtained at its output is shown generally in FIG. 4. A mixing stage 22 comprises a vacuum tube $V_2$ having a double triode contained therein and it will be seen that the two plates of the double triode are connected together and that the cathodes are likewise connected through a common resistor $R_{k2}$ to ground. The grid of one section of $V_2$ is connected to the output of oscillator 21 with respect to ground. A variable load resistance $R_L$ is connected between ground and point "G" in the blocking oscillator circuit and the movable element of the variable resistance $R_L$ is connected to the other input grid of $V_2$. Therefore, the wave shape obtained at point "G" in the blocking oscillator circuit 20 is mixed with the higher frequency signal from oscillator 21 such as found in FIG. 4 and the two signals emerge on the plates of $V_2$ and appear as the superimposed wave shape of the signal from oscillator 21 upon the signal from blocking oscillator 20 as found in FIG. 5. The plate resistor $R_{P2}$ of the mixer stage $V_2$ is connected to the B plus voltage supply and to the plates $V_2$. The output signal to be used for the therapeutic excitation of the nerve cells is taken across the plate resistor $R_{P2}$ through a pair of electrodes P and Q, the wave shape being that shown in FIG. 5. Since the superimposed wave shape is of a much higher frequency, the wave form found at point "G" no longer exists and an envelope is formed with the higher frequency superimposed upon the carrier frequency developed by the blocking oscillator 20. This high frequency wave is superimposed upon the blocking oscillator wave, is easily passed through the human body, since the time in which it takes for a human nerve to react to a stimulus is approximately 100 microseconds, and any signal which is applied to the body which is of much shorter duration, say approximately, 10 to 50 $\mu s$. (microseconds) will allow the current to flow through the body to produce nerve stimulation and cause muscle movement.

Figure 8:
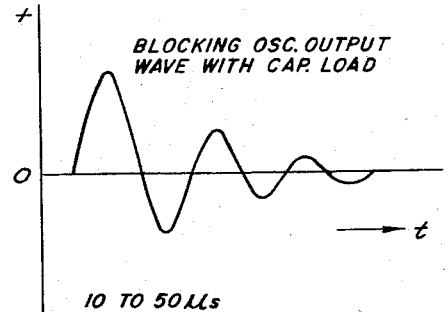
FIG. 8 is a diagram of the wave forms taken at point P–Q using a capacitor in the circuit of FIG. 6.
Figure 9:
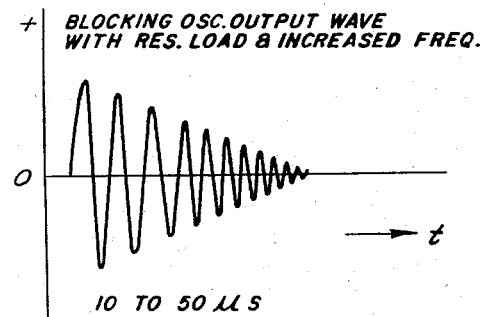
FIG. 9 is a diagram of the wave shape taken at points P–Q when using a resistance connected thereto.

A more practical way to produce the neural wave form such as found in FIG. 5 is to use a device such as that shown in FIG. 6. FIG. 6 employs a blocking oscillator using a transistor TR and having a transformer T with a secondary winding which is inductively coupled to the normal blocking oscillator winding. Capacitors $C_1$ and resistance $R_1$ of FIG. 6 are used to adjust the frequency of the oscillator. The wave shape produced by the blocking oscillator of FIG. 6 is shown in FIG. 7 and is taken across the terminals P–Q. It will be seen that this is a blocking oscillator type wave taken from the collector circuit and that the frequency or period of the wave produced is essentially the same as that for the neural wave shape. By connecting a capacitor $C_3$ across terminals P–Q, an undamped oscillator wave shape will be produced similar to FIG. 8 and this type of circuit is generally known as the ringing circuit. Ringing circuits are well known to those skilled in the art and generally constitute tank circuits employing inductance and capacitance which are shock excited. For certain types of damping, resistances may be added in parallel to provide the type of damping required. Therefore, if a resistor such as $R_4$ is connected across terminals P–Q, the output wave form is found to be similar to that of FIG. 10 upon the resistance $R_4$ having the proper value. Thus it will be seen that in this type of circuit, the same type of wave shape is obtained as found in FIG. 5 for the more elaborate equipment.

Figure 10:
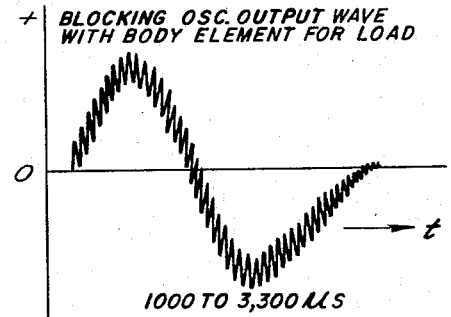
FIG. 10 is a diagram of a wave shape taken at points P–Q with a capacitance-resistance parallel network connected at points P–Q.

It should also be recognized that an equivalent impedance of the human body is generally given by a combination of a capacitor C, and resistance R, in parallel and therefore if the human body is used to replace the equivalent impedance, it will be seen that by placing electrodes at points P and Q and connecting them to the human body, a wave form similar to FIG. 10 will be automatically obtained because of the characteristics of the human body. In other words, by properly choosing the correct values of $R_1$, $C_1$, $R_2$, $C_2$, and the proper inductance for the transformer T of the blocking oscillator, a high frequency voltage superimposed upon a wave form similar to the neural voltage wave form can be produced and be used to treat the human body.

Figure 11:
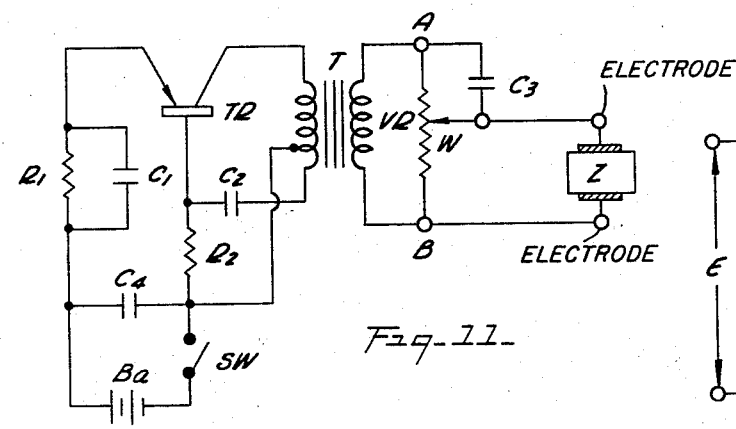
FIG. 11 is a schematic diagram of a transistorized therapeutic device wherein a body member is connected to the circuit.
Figure 12:
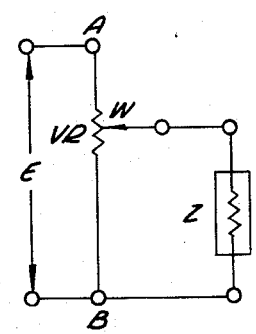
FIG. 12 is a schematic diagram of a variable resistance connected to an impedance.

When using a transistor to produce the signal from the blocking oscillator, an additional problem is created in trying to match the impedance of the human body to points "P–Q" of the secondary winding of transformer T. Therefore, an additional means must be found to correct overloading of the transistor TR so that the impedance at point "P–Q" can be maintained as high as possible thereby producing a good impedance match. In order to show how this has been achieved, reference is made to FIGS. 11, 12, and 13. FIG. 12 shows a circuit using a common variable resistance to control the output voltage by the relative position of the moving element W of the variable resistor VR. Assuming that the value of VR is 10,000 ohms and the moving element W is set to a middle position, the output voltage should then be equal to ½ of the input voltage E. If the human body which generally has an impedance of approximately 1,000 ohms is inserted between wiper arm W and one end of variable resistance VR at "B" the voltage across the body element Z then becomes equal to approximately 0.14E. Thus it will be seen that whereas under a no load condition, the voltage was 0.5E, it has now diminished to 0.14E, or approximately ⅓, through the insertion of the impedance Z generally formed by the insertion of the body. In therapeutic equipment such as described herein, it is desirable to create as small a voltage fluctuation as possible when the electrodes are attached to, or detached from, the human body. Therefore, in order to produce this desirable result, it is necessary to have a source voltage which has very little variation in magnitude regardless of the load variation. For this purpose, it is desirable to have the internal impedance of the output circuit as low as possible yet have a relatively high impedance as seen by the transistor circuit. To further explain the steps in arriving at the value of 0.14E, it will be seen that at first the resistances between points "A" and "W" and between "B" and "W" were 5,000 ohms each, but after insertion of the 1,000 ohm impedance load such as a portion of the body, the resultant resistance of the parallel combination of "B–W" and the impedance created by Z equal to 1,000 ohms, amounts to 830 ohms and the voltage will then become 830/5,000E, or 0.14E.

Figure 13:
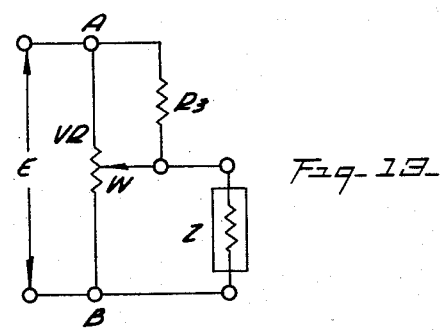
FIG. 13 is an impedance matching device used with the therapeutic equipment.

To improve the operating characteristics, if a resistance such as $R_3$ as shown in FIG. 13 is inserted between points "A" and "W," the resistance $R_3$ is made approximately equal to the body impedance Z, that is 1,000 ohms, it will be seen that a more favorable result may be obtained. Of course a capacitor, such as $C_3$ may also be inserted as long as the proper impedance is obtained. Without attaching the electrodes to the body portion, if the movable element W of the variable resistance VR is adjusted to a position to give 0.5E with respect to point "A," then it may be seen that there is approximately 9,000 ohms at VR between point "W" and point "A" and 1,000 ohms in parallel between A and W due to $R_3$. The resultant resistance will be approximately 1,000 ohms and likewise the resistance between "V" and "W" will be approximately 1,000 ohms which is contributed by the remaining portion of resistance VR. Therefore, there is 1,000 ohms at VR between "W" and "A" and 1,000 ohms contributed by the body Z between "V" and "W" so that the resultant resistance will be approximately 500 ohms and accordingly the output voltage will be 0.3E. Therefore, whereas in the circuit of FIG. 12 the voltage was 0.14E, by the addition of $R_3$ or $C_3$ to the circuit as shown in FIG. 11 or 13, it will be seen that the voltage which is now 0.13 has been obtained which is a reduction of the variation in the voltage by a factor of more than one half. If the only purpose of the impedance matching network was to create a reduction of voltage variation, it would be sufficient to reduce the value of the variable resistance VR. However, in the case of the circuit as shown in FIG. 11, in which the output is directly connected to the transistorized blocking oscillator circuit, it would be undesirable to have the value of the variable resistance VR at such a low value. Furthermore, since the output energy of the circuit is limited, if a low value variable resistance VR is used, it will be seen that the portion of the load of VR that can be used to be connected to the human body becomes decreasingly smaller and hence the amount of energy applied to the body also decreases. For this reason, it is desirable that the value of the variable resistance VR be kept as high as possible. Thus, when the variable resistance value VR is kept as high as possible, by the use of resistance $R_3$ or $C_3$ applied between points "A" and "W," and setting the moving elements W near point "A," the power consumption of resistance VR will become smaller and a greater amount of power will be applied to the human body element Z. Because the power consumption of the circuit is important, a capacitor $C_4$ is placed in parallel with battery $Ba$ and compensates for the voltage drop due to increased internal resistance of battery $Ba$ as it ages. Switch $Sw$ serves to connect the battery to the circuit.

Typical values of the components as used in the invention are set out below in regards to FIGS. 6 and 11:

FIGURE 6

| Ref. No.: | Value |
|---|---|
| $C_1$ | 10 µf. |
| $C_2$ | 0.2 µf. |
| $R_1$ | 5K ohms. |
| $R_2$ | 250K ohms. |

FIGURE 11

| Ref. No.: | Value |
|---|---|
| $C_1$ | 10 µf. |
| $C_2$ | 2 µf. |
| $C_3$ | 0.005 µf. |
| $R_1$ | 5K ohms. |
| $R_2$ | 250K ohms. |
| $R$ | 10K ohms. |
| $VR$ | 20K ohms. |

From the foregoing description of my invention it will be seen that I have provided means for producing a therapeutic voltage to act upon the nerves and thereby massage the muscles associated therewith. In the more simple form of my invention, it has been shown that a blocking oscillator using a transistorized circuit may be used to create a voltage similar to a neural wave voltage and at a much higher frequency to stimulate the nerves to cause excitation of the muscles. It can also be seen that by the use of the impedance matching circuit, in conjunction with the electrical therapeutic equipment, that a means has been devised to sustain the battery life while maintaining high internal impedance within the blocking oscillator circuit and yet provides a device for creating a small voltage variation when applying the electrodes to or removing the electrodes from the human body.

It will, of course, be understood that various changes may be made in the form, details, arrangement and proportions of the parts without departing from the scope of my invention which consists of the matter shown and described herein and set forth in the appended claims.

I claim:
1. An electrical therapeutic generator for treatment of the human body comprising:
  (a) blocking oscillator means producing an electrical signal of substantially the same frequency as a neural voltage waveform produced by body nerve cells and generally in the order of 300 to 1000 cyles per second;
  (b) signal generating means associated with said blocking oscillator means for generating a signal having a frequency of at least 60 to 100 times that generated by said blocking oscillator;
  (c) circuit mixing means electrically connecting said signal generating means to said blocking oscillator means and superimposing said electrical signal generated by said signal generating means upon said electrical signal from said blocking oscillator;
  (d) and electrode means connected to said circuit means, said electrode means being adapted for connecting a portion of the human body therebetween.

2. The invention as set forth in claim 1 wherein: said signal generating means includes an oscillator producing a signal having a frequency between 20 and 100 kilocycles per second.

3. The invention as set forth in claim 1 wherein: said signal generating means includes a ringing circuit having an inductive element magnetically coupled to said blocking oscillator and a variable resistance element having a movable element connected in parallel therewith, another resistance element connecting one end of said variable resistance element to the movable element thereof; said electrode means being connected to the other end of said variable resistance and said movable element thereof, both of which are adaptable to connect the human body therebetween, said ringing circuit generating signals having a frequency between 20 and 100 kilocycles per second.

4. The invention as set forth in claim 1 wherein: said signal generating means includes a ringing circuit having an inductive element and a variable resistance element having a movable element connected in parallel and responsive to said signals of said blocking oscillator, the signals of said ringing circuit having a frequency above that generated by said blocking oscillator, and wherein said electrode means are connected to one end of said variable resistance element and to the movable element thereof.

References Cited by the Examiner

UNITED STATES PATENTS

| | | | |
|---|---|---|---|
| 1,801,385 | 4/1931 | Rose | 128—419 X |
| 2,004,751 | 6/1935 | Fischer | 128—420 X |
| 2,375,575 | 5/1945 | Morland | 128—421 X |
| 2,532,788 | 12/1950 | Sarnoff | 128—421 |
| 2,864,371 | 12/1958 | Parodi | 128—419 |
| 3,025,858 | 3/1962 | Browner | 128—422 |
| 3,050,695 | 8/1962 | DuVall | 128—421 X |
| 3,057,356 | 10/1962 | Greatbatch | 128—422 |

FOREIGN PATENTS 523,822  4/1956  Canada.

RICHARD A. GAUDET, *Primary Examiner.*

SIMON BRODER, *Examiner.*